Figure 1:
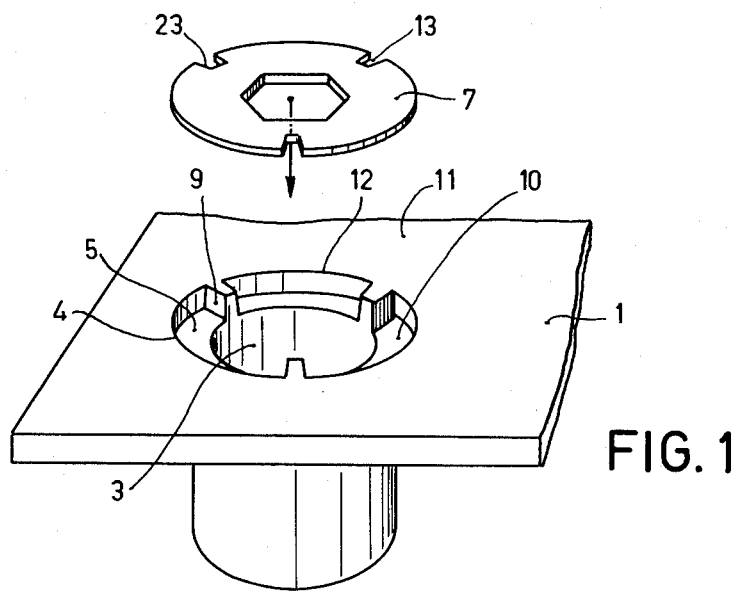

United States Patent [19]

Eisemann

[11] 4,257,466
[45] Mar. 24, 1981

[54] DEVICE FOR CAPTIVELY RETAINING A THREADED MEMBER

[75] Inventor: Kurt Eisemann, Berlin, Fed. Rep. of Germany

[73] Assignee: U.S. Philips Corporation, New York, N.Y.

[21] Appl. No.: 28,410

[22] Filed: Apr. 9, 1979

[30] Foreign Application Priority Data

May 3, 1978 [DE] Fed. Rep. of Germany ....... 2819336

[51] Int. Cl.³ .............................................. F16B 37/04
[52] U.S. Cl. ..................................... 411/371; 411/83; 411/531; 403/19
[58] Field of Search .................... 151/69, 41.73, 41.74; 85/1 K, 32 K

[56] References Cited

U.S. PATENT DOCUMENTS

| 1,166,345 | 12/1915 | Gates | 85/32 K |
| 1,897,253 | 2/1933 | Gaubert et al. | 151/41.74 UX |
| 2,718,155 | 9/1955 | Firth | 151/69 UX |

FOREIGN PATENT DOCUMENTS 52-9756  1/1977  Japan ........................................ 151/69

Primary Examiner—Ramon S. Britts
Attorney, Agent, or Firm—David R. Treacy

[57] ABSTRACT

A device for capturing a screw or nut loosely in a recess in a plastic part. The recess has inward ridges extending longitudinally from a ring-positioning rim. A retaining ring, having indentations corresponding to the ridges, is rotated to cut through and be held securely by the ridges.

2 Claims, 3 Drawing Figures

DEVICE FOR CAPTIVELY RETAINING A THREADED MEMBER

The invention relates to a device for captively retaining a threaded member in position on a plastic part, said threaded member being loosely accommodated in a recess, in particular for the captive retention of screws on record players.

Devices for retaining loosened screws or nuts are known. Generally they comprise a cage which retains the screw head or nut in position in such a way that the threaded member is movable but cannot drop out completely.

It is the object of the invention to provide a device for captively retaining a threaded member in position on a plastic component, which device is easy to install, which can be manufactured economically and which can always be removed.

According to the invention this is achieved with a device of the type described above in which the wall of the recess is provided with projecting ridges, and a retaining ring is insertable in the recess. The ring is formed with peripheral indentations alignable with the ridges while in an inserting position, the edges of the indentations cutting through the ridges when upon insertion of the retaining ring this ring is rotated relative to the recess.

In order to secure it in the recess, the retaining ring should merely be rotated after which it remains in position in an absolutely tight manner. The ring may readily be removed by rotating it in the reverse direction so that the ridges and the peripheral indentations of the retaining ring again coincide with each other.

Figure 2:
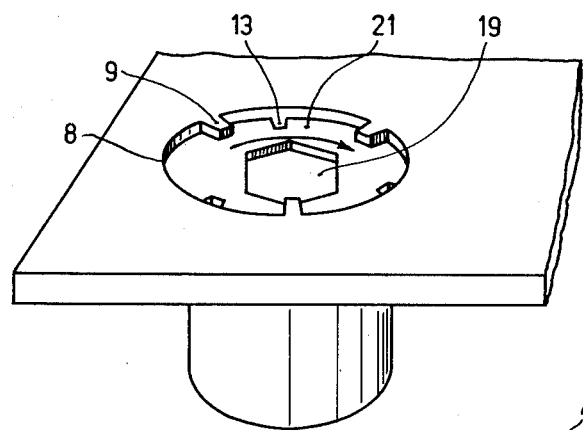
Figure 3:
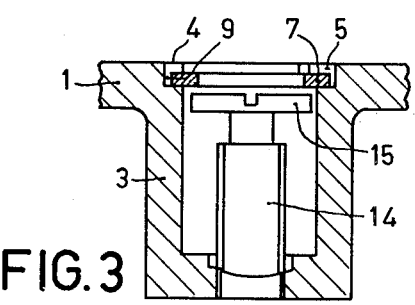

The invention will now be described in more detail with reference to the drawing which shows an embodiment. In the drawing:

FIG. 1 is a perspective view of the two associated parts of the retaining device, i.e. a cup-shaped recess and a retaining ring, FIG. 2 shows the retaining ring rotated in the retaining position in the cup-shaped recess, FIG. 3 is a cross-section through the retaining device.

In a preferred embodiment the retaining device is intended for retaining a threaded member on the plastic deck plate of a record player, in particular for retaining the head of a metal screw in position. However, it is also possible to use the same device for the captive retention of a nut. It will be clear that the retaining device may also be used in conjunction with any other plastic part.

In the present embodiment a cup-shaped recess 3 is formed in a plastic injection-molded deck plate 1. Slightly underneath the opening this cup-shaped recess 3 has a ring-positioning-rim 5 which has as a positioning surface 10 for a retaining ring 7. Near the rim radially inward projecting ridges 9 are formed on the wall 8 of the recess 3, which ridges are uniformly spaced over the circumference of the rim and which extend longitudinally from the rim surface 10 to the surface 11 of the part 1. In the present embodiment there are provided three ridges 9; however, it is readily possible to provide more ridges.

The retaining ring 7 is dimensioned so that it fits with play in the cup-shaped recess 3 or can be lowered from the top edge 12 onto the rim. In order to enable insertion the retaining ring is formed with slotted peripheral indentations 13, which are dimensioned so that they surround the ridges 9 with sufficient clearance when the ring is lowered (moved longitudinally) into the cup-shaped recess.

Upon insertion of a screw 14 having a head 15 into the cup-shaped recess 3, the retaining ring is placed onto the positioning surface 10. Now a tool such as a wrench, for example an allen wrench, may be inserted in the hexagonal central opening 19 of the retaining ring. The ring is subsequently rotated in the direction of the arrow 21 in FIG. 2. The edges 23 of the indentations 13 then cut through the ridges 9 and the indentations 13 no longer coincide with the ridges 9. Thus, the retaining ring 7 is firmly secured, because its rim is clamped between the remaining ridge portions, while access to the screw head by a screwdriver or similar tool is provided through the opening 19.

The retaining ring 7 can be non-destructively removed by rotating it against the direction of the arrow 21 or by rotating the ring further in the direction of the arrow 21 until the ridges 9 again coincide with the indentations 13. In this position the retaining ring 7 may readily be removed.

What is claimed is:

1. A threaded member retaining device, comprising
a plastic part having a recess;
a threaded member loosely accommodated in the recess, and
a retaining ring located in the recess for capturing the threaded member,
wherein the recess has a ring-positioning-rim, and a wall having a plurality of radially inward projecting ridges extending longitudinally from the rim, and
the retaining ring has a corresponding plurality of peripheral indentations arranged to provided clearance from said ridges when the ring is in an insertion position for longitudinal movement of the ring into or out of the recess, and means for engagement by a tool to rotate the ring, in a retaining position the ring being rotated from said insertion position such that the periphery of the ring between said indentations cuts through said ridges, whereby in the retaining position the ring is secured against longitudinal movement or unintended rotation to the insertion position, but the ring may non-destructably be rotated from the retaining position to the insertion position for removal.

2. A device as claimed in claim 1, wherein said means for engagement comprises a central opening which provides access for a tool for cooperation with the threaded part and also is engageable by a tool for rotation of the ring to and from the retaining position.

* * * * *